United States Patent
Tsuruki et al.

(10) Patent No.: US 11,327,209 B2
(45) Date of Patent: May 10, 2022

(54) DIFFRACTIVE OPTICAL ELEMENT AND METHOD OF MANUFACTURING THE SAME, CURABLE RESIN COMPOSITION, AND OPTICAL APPARATUS

(71) Applicant: CANON KABUSHIKI KAISHA, Tokyo (JP)

(72) Inventors: Yuuta Tsuruki, Yokohama (JP); Emi Oishi, Kawasaki (JP); Hideo Ukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 16/585,771

(22) Filed: Sep. 27, 2019

(65) Prior Publication Data
US 2020/0103567 A1 Apr. 2, 2020

(30) Foreign Application Priority Data
Oct. 2, 2018 (JP) .............................. JP2018-187090

(51) Int. Cl.
*G02B 5/18* (2006.01)
*G02B 1/04* (2006.01)
*G02B 27/42* (2006.01)

(52) U.S. Cl.
CPC .............. *G02B 5/1852* (2013.01); *G02B 1/04* (2013.01); *G02B 5/1866* (2013.01); *G02B 27/4211* (2013.01)

(58) Field of Classification Search
CPC ........ B82Y 40/00; G02B 1/04; G02B 5/1866; G02B 5/1852; G02B 5/1871; G02B 27/4211; G02B 27/4272
USPC ................... 359/569, 571, 576; 428/212
See application file for complete search history.

(56) References Cited

U.S. PATENT DOCUMENTS

| | | | | |
|---|---|---|---|---|
| 2009/0128912 | A1* | 5/2009 | Okada | C08J 7/0427 359/576 |
| 2010/0110548 | A1* | 5/2010 | Korenaga | G02B 5/1852 359/571 |
| 2012/0008210 | A1* | 1/2012 | Korenaga | G02B 13/003 359/570 |
| 2014/0043687 | A1* | 2/2014 | Murata | G02B 5/1876 359/571 |
| 2015/0175861 | A1* | 6/2015 | Nagata | C08J 3/28 428/80 |
| 2016/0049610 | A1* | 2/2016 | Harkema | H01L 51/5268 257/40 |

FOREIGN PATENT DOCUMENTS

JP 2008-203821 A 9/2008

* cited by examiner

*Primary Examiner* — Audrey Y Chang
(74) *Attorney, Agent, or Firm* — Canon U.S.A., Inc., IP Division (57) ABSTRACT

In a diffractive optical element including a base material, a first resin layer having a diffraction grating shape including plural concentric ring bands, and a second resin layer containing an inorganic particle, the inorganic particle is adjusted to have a number mean particle diameter of 10 nm or less, a first peak in a region in which particle diameters are 2 nm or more and 7.9 nm or less, and a second peak in a region in which particle diameters are larger than those of the first peak in a grain size distribution on a volumetric basis, with the ratio of the maximum intensity of the second peak to the maximum intensity of the first peak being 0.3 or more and 0.8 or less in a grain size distribution.

15 Claims, 4 Drawing Sheets

DIFFRACTIVE OPTICAL ELEMENT AND METHOD OF MANUFACTURING THE SAME, CURABLE RESIN COMPOSITION, AND OPTICAL APPARATUS

BACKGROUND OF THE INVENTION

Field of the Invention

The present disclosure relates to a diffractive optical element used for an optical apparatus such as a still camera and a video camera and a method of manufacturing the diffractive optical element, an optical apparatus provided with the diffractive optical element, and a curable resin composition used for the diffractive optical element.

Description of the Related Art

A diffractive optical element using two resins with different optical characteristics is known as an optical element used for a lens and the like. This diffractive optical element utilizes the nature that chromatic aberration generated in a diffraction optical system is completely opposite to that generated in a dioptric optical system to suppress chromatic aberration as a lens. This diffractive optical element also makes a significant reduction in size and weight of a lens as a whole feasible. In addition, suppression of chromatic aberration of a lens has been required to be achieved at a higher level accompanied by an improvement in image quality of optical apparatus such as a camera and a video camera in recent years. Diffractive optical elements are required to achieve high diffractive efficiency over the entire region of visible light (from 400 nm to 700 nm in wavelengths of light) to comply with this high-level requirement.

For example, Japanese Patent Application Laid-Open No. 2008-203821 discloses, as a configuration of a diffractive optical element having high diffractive efficiency over the entire region of visible light, a configuration in which a first resin layer and a second resin layer are laminated on a base material, with the first resin layer including a high refractive index and low dispersion resin having a diffraction grating shape, and the second resin layer including a low refractive index and high dispersion resin. The diffraction grating shape is a relief type including plural concentric ring bands.

SUMMARY OF THE INVENTION

According to a first aspect of the present disclosure, a diffractive optical element comprises a base material, a first resin layer and a second resin layer laminated in this order, wherein the first resin layer has a diffraction grating shape including a plurality of concentric ring bands on a side facing the second resin layer, and the second resin layer contains an inorganic particle, wherein the inorganic particle has a number mean particle diameter of 10 nm or less, has a first peak in a region in which particle diameters are 2 nm or more and 7.9 nm or less and has a second peak in a region in which particle diameters are larger than the particle diameters of the first peak in a grain size distribution on a volumetric basis, and a ratio of a maximum intensity of the second peak to a maximum intensity of the first peak is 0.3 or more and 0.8 or less.

According to a second aspect of the present disclosure, an optical apparatus, comprises: a casing; and an optical system including a plurality of lenses disposed in the casing, wherein at least one of the lenses is the diffractive optical element according to the first aspect.

According to a third aspect of the present disclosure, a curable resin composition comprises an inorganic particle and a curable resin, wherein the inorganic particle has a number mean particle diameter of 10 nm or less, has a first peak in a region in which particle diameters are 2 nm or more and 7.9 nm or less and has a second peak in a region in which particle diameters are larger than the particle diameters of the first peak in a grain size distribution on a volumetric basis, and a ratio of a maximum intensity of the second peak to a maximum intensity of the first peak is 0.3 or more and 0.8 or less.

According to a fourth aspect of the present disclosure, a method of manufacturing a diffractive optical element includes a base material, a first resin layer and a second resin layer laminated in this order, wherein the first resin layer has a diffraction grating shape including a plurality of concentric ring bands on a side facing the second resin layer, and the second resin layer contains an inorganic particle, the method comprising: forming the first resin layer having the diffraction grating shape on the base material; crushing, classifying and adjusting the inorganic particle so that the inorganic particle has a number mean particle diameter of 10 nm or less, has a first peak in a region in which particle diameters are 2 nm or more and 7.9 nm or less and has a second peak in a region in which particle diameters are larger than the particle diameters of the first peak in a grain size distribution on a volumetric basis and that a ratio of a maximum intensity of the second peak to a maximum intensity of the first peak is 0.3 or more and 0.8 or less; mixing the inorganic particle having been subjected to the adjusting and a curable resin to prepare a curable resin composition; and disposing a mold opposite to the first resin layer, filling a space between the first resin layer and the mold with the curable resin composition and hardening the curable resin composition.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

(Diffractive Optical Element)

A diffractive optical element of the present disclosure has a feature that, in a laminated configuration provided with a base material, a first resin layer and a second resin layer, a refractive index difference in the second resin layer is reduced by limiting a grain size distribution of inorganic particles contained in the second resin layer to reduce a phase shift of a transmitted wavefront.

Hereinbelow, embodiments of the diffractive optical element of the present disclosure will be described with reference to drawings. The present invention is not limited to the following embodiments, and those in which a modification, an improvement or the like is appropriately added to the following embodiments based on ordinary knowledge of a person skilled in the art without departing from the spirit of the present disclosure are also within the scope of the present invention.

Figure 1A:
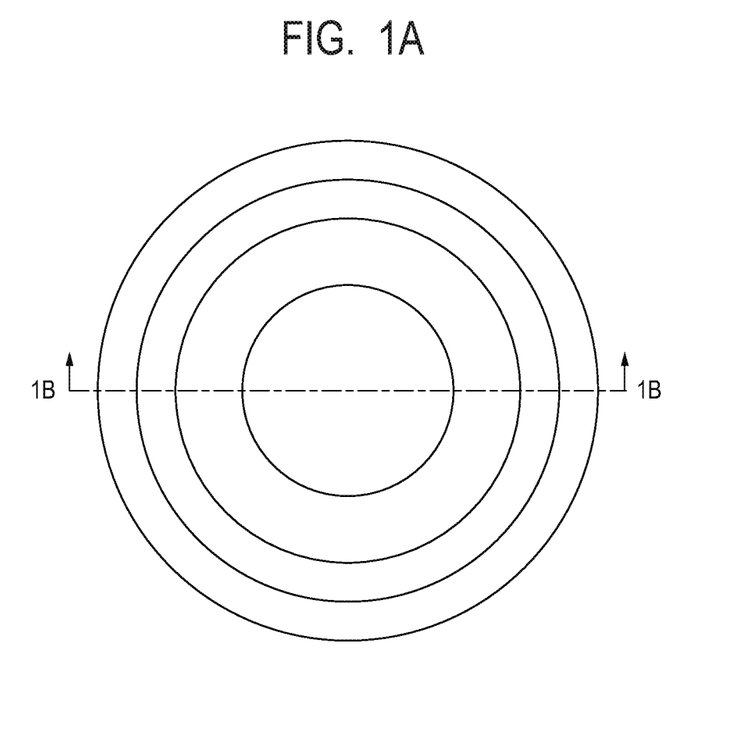
FIG. 1A is a plan view illustrating an overview of a diffractive optical element according to one embodiment of the present disclosure.
Figure 1B:
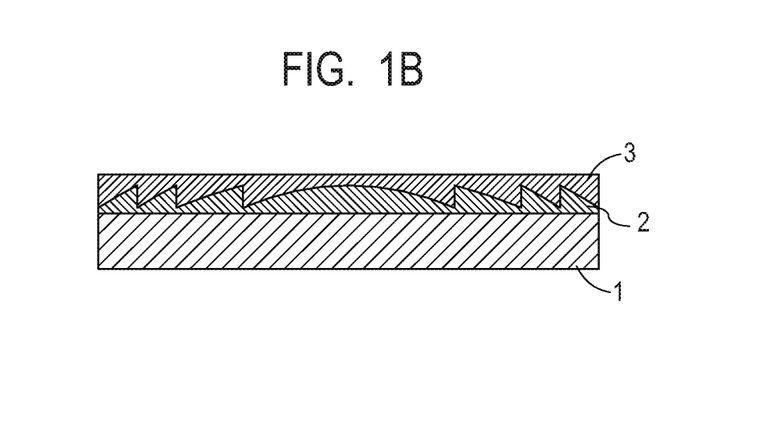
FIG. 1B is a cross-sectional view along the line 1B-1B in FIG. 1A.

FIG. 1A and FIG. 1B are schematic views illustrating one embodiment of the diffractive optical element of the present disclosure, FIG. 1A is a plan view illustrating the overview of the diffractive optical element, and FIG. 1B is a cross-sectional view along the line 1B-1B in FIG. 1A.

As shown in FIG. 1B, the diffractive optical element of the present disclosure is a laminated body having a base material 1, a first resin layer 2 and a second resin layer 3 in this order. The first resin layer 2 has a diffraction grating shape including plural concentric ring bands on a side facing the second resin layer 3, and the second resin layer 3 contains an inorganic particle. An additional base material may be laminated on the second resin layer 3.

The base material 1 is a transparent base material including glass or plastic, for example. Both sides of the base material 1 may be plane, spherical-shape or aspherical-shape.

The first resin layer 2 and the second resin layer 3 are configured such that the first resin layer 2 is a high refractive index and low dispersion layer having a high refractive index and high Abbe's number relative to the second resin layer 3, and the second resin layer 3 is a low refractive index and high dispersion layer having a low refractive index and low Abbe's number relative to the first resin layer 2, for example. That is, when the refractive index and Abbe's number of the first resin layer 2 are nd1 and ν1 respectively and the refractive index and Abbe's number of the second resin layer 3 are nd2 and ν2 respectively, relationships of nd1<nd2 and ν1<ν2 are satisfied in the configuration. The Abbe's number herein is an index representing a gradient of refractive indexes in the visible light region (from 468.1 nm to 656.3 nm) and is calculated by the following equation (1).

$$\text{Abbe's number } \nu=(nd-1)/(nf-nc) \quad (1)$$

nd: refractive index at d line (587.6 nm)
nf: refractive index at f line (486.1 nm)
nc: refractive index at c line (656.3 nm)

The first resin layer 2 has a diffraction grating shape on the side facing the second resin layer 3, and the diffraction grating shape includes a concentric circular relief pattern including N circles (N is an integer of two or more) centering on a diffractive optical element center. Accordingly, the diffraction grating shape has plural ring bands, and a grating pitch (a width of a ring band in a radial direction of the concentric circles) is large in the vicinity of the center of the diffractive optical element and decreases toward the periphery.

The kind of resin constituting the first resin layer 2 is not particularly limited, but material having linear dispersion characteristics with a partial dispersion ratio θgF smaller than that of usual material is preferably used as low refractive index and high dispersion material in order to obtain high diffractive efficiency equal to or more than 99% over the entire visible light region. In order to obtain these linear dispersion characteristics, a method in which inorganic particles are dispersed in and mixed to base resin material is known, and titanium oxide, indium tin oxide, zirconium oxide and the like can be suitably used. In addition, the base resin is preferably ultraviolet curable resin material, and is especially preferably acrylate-type resin.

The second resin layer 3 is formed from a curable resin composition containing resin and inorganic particles having a number mean particle diameter of 10 nm or less. That is, the second resin layer 3 is a cured product of a curable resin composition. The number mean particle diameter of the inorganic particles is desirably a particle diameter of a magnitude not adversely affecting light transmittance, optical scattering and the like and is preferably 1 nm or more. In addition, the inorganic particles include at least one selected from the group consisting of Al, Zr, Y, Ga, La, oxides thereof and compounds thereof, but the inorganic particles are preferably zirconia particles.

Figure 4:
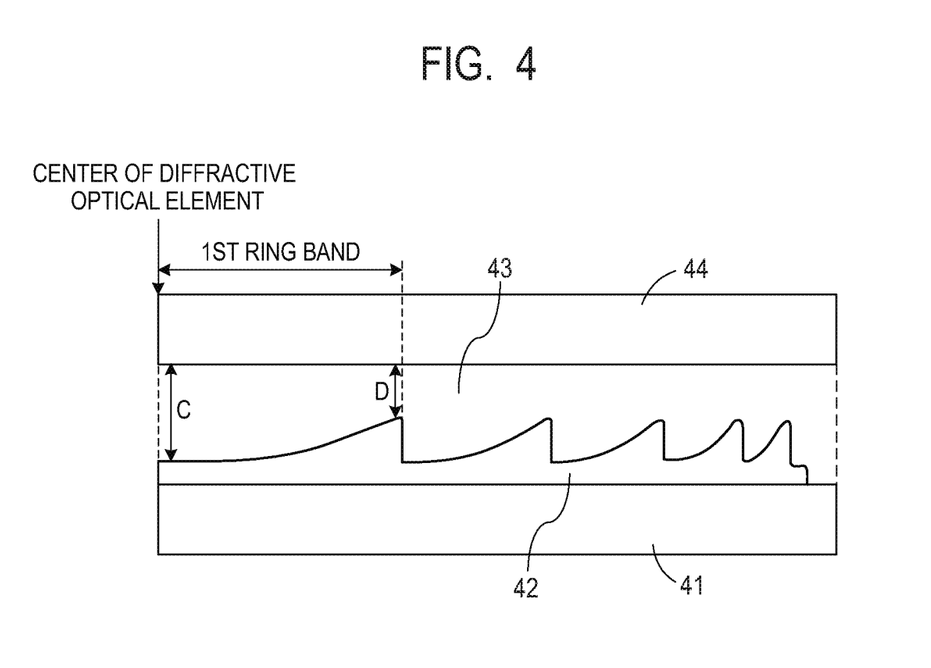
FIG. 4 is a schematic cross-sectional view for describing a disadvantage of a diffractive optical element of the conventional technique.

FIG. 4 illustrates a schematic cross-sectional view of a diffractive optical element of the conventional technique. In the figure, the left edge is the center of the diffractive optical element, and a part from the center to the first difference in level is a first ring band. As illustrated in FIG. 4, this diffractive optical element is manufactured by hardening a second resin layer 43 while keeping the second resin layer 43 constrained by a second base material 44 and a first resin layer 42 which has a diffraction grating shape and is disposed on a first base material 41. Therefore, even though the part C (a thick part) of the second resin layer 43 tends to contract more than the part D (a thin part), the part C cannot contract freely because the second resin layer 43 is sandwiched by the base materials 41, 44, and its surface shape is constrained. As a result, the density of the part C becomes low and the density of the part D becomes high, and a refractive index difference between the part C and the part D is generated. At this time, since flowability of the resin is high at an early period of hardening, the resin moves so as to cancel the difference in contraction amounts and a difference in density is hardly generated. However, flowability of the resin decreases as hardening progresses, the difference in contraction amounts decreasingly able to be canceled by the movement of the resin, and a refractive index difference remains at a time when hardening is finally completed. In addition, this refractive index difference is generated in larger amount at a ring band having a wide width. This is because when the width of the ring band is wide, a moving distance of the resin required to cancel the difference in contraction amounts is long, flowability of the resin decreases as hardening progresses, and a refractive index difference is generated at an earlier period.

There has been the following disadvantage: when this diffractive optical element is used for photographing, a phase shift of a transmitted wavefront is generated due to the refractive index difference generated in one ring band of the second resin layer and a desired image quality cannot be obtained.

Figure 2:
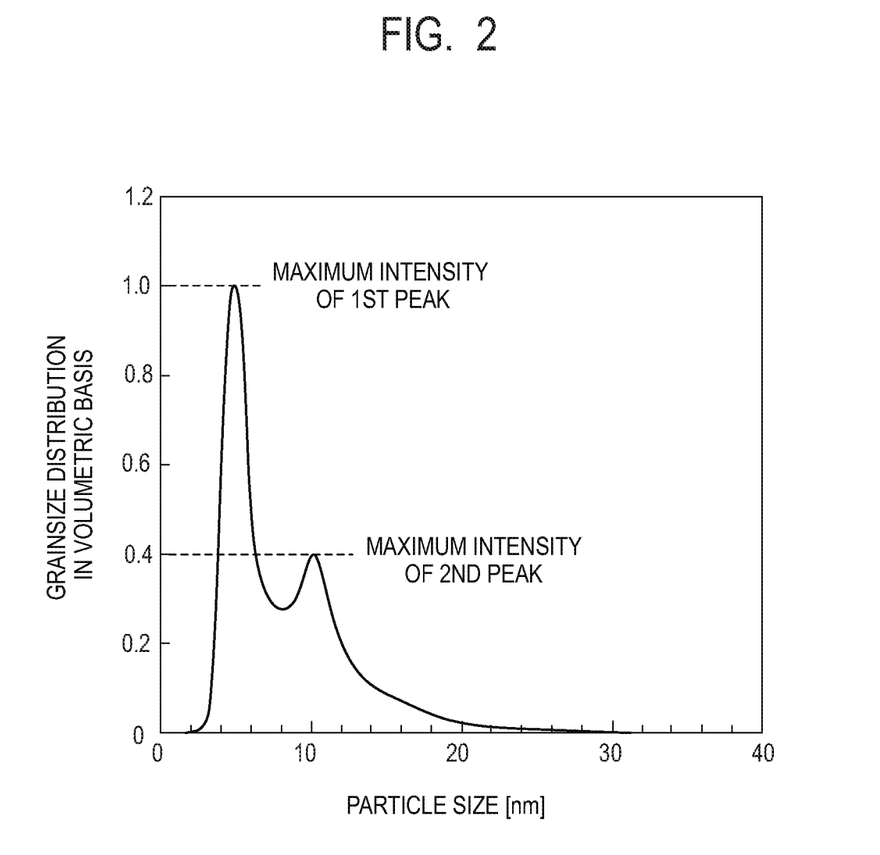
FIG. 2 is a graph illustrating a grain size distribution of inorganic particles in a second resin layer of a diffractive optical element of the present disclosure.

FIG. 2 is a graph illustrating an example of a grain size distribution on a volumetric basis of inorganic particles contained in the second resin layer 3 of the present disclosure. In the present disclosure, the inorganic particles contained in the second resin layer 3 have a first peak in a region in which particle diameters are 2 nm or more and 7.9 nm or less and have a second peak in a region in which particle diameters are larger than those of the first peak in the grain size distribution on a volumetric basis. In FIG. 2, a frequency distribution is illustrated after being normalized based on the maximum intensity of the first peak as 1.0.

In the present disclosure, the ratio of the maximum intensity of the second peak to the first peak (second peak/first peak) of the inorganic particles is 0.3 or more and 0.8 or less. When the intensity ratio is less than 0.3, the proportion of the inorganic particles having the second grain size distribution is small, and therefore a viscosity of the curable resin composition becomes too high and flowability cannot be secured at a time of molding to cause a refractive index difference within the same ring band. On the other hand, when the intensity ratio is more than 0.8, the inorganic particles having the second grain size distribution are too many, and therefore the contact area between the resin and the inorganic particles decreases and the viscosity of the curable resin composition becomes too low. As a result, the inorganic particles are more likely to move at a time of molding, a large amount of scattered light is generated, and a Haze value deteriorates. Therefore, a diffractive optical element with the intensity ratio of more than 0.8 is not preferable.

Here, a half width of the first peak is preferably 1.8 nm or more and 2.5 nm or less. The half width of the first peak satisfying this range indicates that the range of the first grain size distribution is narrow and can control the viscosity of the curable resin composition with particles with small particle diameters. Therefore, generation of scattered light can be easily suppressed. The half width herein refers to a full width at half maximum (FWHM).

In addition, the second peak is preferably located in a range where particle diameters are 8 nm or more and 20 nm or less. When the second peak is located in this range, generation of scattered light can be easily suppressed. In addition, a half width of the second peak is preferably 6.3 nm or more and 8.1 nm or less.

In addition, a volume mean particle diameter of the inorganic particles is preferably 11.3 nm or more and 14.6 nm or less. When the intensity ratio between the first peak and the second peak is within the above range and the mean particle diameter satisfies this range, moldability of the second layer 3 becomes good.

In addition, a maximum particle diameter of the inorganic particles is preferably 100 μm or less. It is because if a coarse particle bigger than 100 μm exists, scattered light may be easily generated.

It is desirable that a contained amount of the inorganic particles in the second resin layer is 1% by volume or more and 29% by volume or less, and preferably 5% by volume or more and 25% by volume or less in the second resin layer 3. When the contained amount is less than 1% by volume, a refractive index may not be made high and desired optical characteristics may not be obtained. In addition, when the contained amount is more than 29% by volume, moldability may deteriorate.

The inorganic particles are desirably subjected to surface treatment in advance as necessary. Surface treatment may be carried out during synthesis and preparation steps of the inorganic particles or may be separately carried out after fine particles have been obtained. In addition, a surface treatment agent or a dispersing agent (surfactant) for uniformly dispersing the inorganic particles without aggregation is desirably used. It is commonly known that when particles are dispersed in a solvent, resin or the like using a surface treatment agent or a dispersing agent, a dispersed state to be provided varies according to a type, an addition amount, a molecular weight, polarity, affinity and the like of the surface treatment agent or the dispersing agent to be added. A derivative of a pigment, a resin-type agent or an activator-type agent can be suitably used as the surface treatment agent and the dispersing agent. Here, a cationic, weakly cationic, nonionic, or amphoteric surfactant is useful as the surface treatment agent or the dispersing agent. Especially, polyester-type, ε-caprolactone-type, polycarboxylate, poly- phosphate, hydroxystearate, amidosulfonate, polyacrylate, olefin-maleate copolymer, acrylate-maleate copolymer, alkylamine acetate, alkyl fatty acid salt, polyethylene glycol fatty acid ester-type, silicone-type and fluorine-type agents can be used.

Resin as a dispersion medium of the inorganic particles in the second resin layer 3 is curable resin which is liquid in room temperature, and resin hardened by a radical generating mechanism using a polymerization initiator such as a photopolymerization initiator or a heat polymerization initiator is used.

Examples of the curable resin used for formation of the second resin layer 3 include (meth)acrylic-type resin, vinyl-type resin, polyester-type resin, polyamide-type resin, urethane-type resin and epoxy resin, for example, but are not limited thereto. One curable resin can be used alone, or two or more can be used in combination. Especially, (meth)acrylic-type resin is preferable from the point of appropriately controlling reaction speed of photopolymerization with mono(2-acryloyloxyethyl) succinate described below. A monomer, dimer, trimer, oligomer or polymer of a compound including a (meth)acrylate group or a mixture thereof can be used as (meth)acrylic-type resin as the curable resin.

Any compound can be used as a monomer of the (meth) acrylic-type resin as long as the compound includes a (meth)acrylate group, but a compound including two or more (meth)acrylate groups is preferable. Specific examples of the compound including two or more (meth)acrylate groups can include an acrylate and methacrylate of propoxylated bisphenol A divinyl ether; a polyethylene glycol di(meth)acrylate, a polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, tricyclodecane dimethanol diacrylate, tris((meth)acryloyloxyethyl)isocyanurate and tris(2-(meth)acryloyloxyethyl)isocyanurate. One compound including two or more (meth)acrylic groups can be used alone, or two or more can be used in combination. In addition, a compound having a polymerizable functional group which also has a carbon-carbon double bond or a carbon-carbon triple bond in its molecule can be used as the compound including two or more (meth)acrylic groups.

The polymerization initiator can be appropriately selected according to hardening conditions (irradiation wavelength and irradiation dose) of the curable resin. Examples of the photopolymerization initiator include an alkylphenone-type photopolymerization initiator, an acylphosphineoxide-type photopolymerization initiator and a titanocene-type photopolymerization initiator. In particular, 2-benzyl-2-dimethylamino-(4-morpholinophenyl)-1-butanone, 1-hydroxycyclohexyl phenyl ketone, bis(2,4,6-trimethylbenzoyl) phenylphosphine oxide, 4-phenylbenzophenone and the like can be exemplified. In addition, azo compounds such as azobisisobutyronitrile (AIBN) and peroxides such as benzoyl peroxide, tert-butyl peroxypivalate, tert-butylperoxyneohexanoate, 1,1-dimethyl butylperoxyneohexanoate, tert-butylperoxyneodecanoate, 1,1-dimethyl butylperoxyneodecanoate, cumylperoxyneohexanoate and cumylperoxyneodecanoate can be exemplified as the heat polymerization initiator.

An addition ratio of the polymerization initiator can be appropriately selected according to a light irradiation dose or a heating temperature and can also be adjusted according to a target mean molecular weight of a polymer to be obtained. In addition, while a contained amount of the polymerization initiator may vary according to a contained amount of the inorganic particles, the contained amount of the polymerization initiator is preferably selected so as to be within a range of 0.01 parts by mass or more and 10.00 parts by mass or less and preferably 0.50 parts by mass or more and 5.00 parts by mass or less based on a total mass of the curable resin and the dispersing agent as 100 parts by mass. By setting the contained amount of the polymerization initiator within this range, a polymer can be obtained with good moldability, and poor appearance or deterioration in transparency due to coloring can be prevented. One polymerization initiator can be used alone, or two or more can be used in combination according to reactivity with organic components, a wavelength of light irradiation and a heating temperature.

A preparation method of the curable resin composition for forming the second resin layer 3 will be described below. First, an adjustment step in which inorganic particles are crushed, classified, and adjusted to have the above grain size distribution is conducted. In particular, an appropriate amount of the above dispersing agent is dissolved in an organic solvent, inorganic particles are added thereto, and then physical energy is applied to the inorganic particles by ultrasonic treatment, beads mill treatment or the like. Aggregated inorganic particles are crushed by shear force applied to the inorganic particles, and the grain size distribution in a final hardened product (second resin layer 3) can be adjusted. Remaining aggregated particles are removed by centrifugation or filter treatment to obtain a uniform inorganic particle dispersion liquid. At this time, an excess amount of the dispersing agent can further be removed by reprecipitating inorganic particles using a poor solvent or the like followed by solid-liquid separation, subsequently washing the particles with a poor solvent, and redispersing the particles in an organic solvent. Then, curable resin and a photopolymerization initiator are dissolved. After achievement of uniform mixing has been confirmed, the organic solvent is removed by using an evaporator or a concentrator. At this time, it is desirable that a pressure reduction degree is appropriately adjusted according to the boiling point of the organic solvent, an amount of residual solvent or the like. Since dispersibility of the inorganic particles may be impaired due to rapid evaporation of the solvent, heating may be carried out at a level not impairing dispersibility as necessary when the solvent is removed under reduced pressure. It is desirable that an amount of residual solvent is reduced as much as possible because the organic solvent remaining in the obtained curable resin composition may affect durability, optical characteristics or the like of a molded product. A contained ratio of the organic solvent is preferably 0.50 parts by mass or less, more preferably 0.1 parts by mass or less, and desirably 0.025 parts by mass or less in 100 parts by mass of the curable resin composition.

Any solvent can be used as the organic solvent capable of being used for preparing the curable resin composition as long as the curable resin and the dispersing agent can be dissolved in the solvent. For example, an aromatic compound having a low boiling point such as toluene and xylene; an alcohol such as methanol, ethanol, n-propanol, isopropanol, n-butanol, s-butanol and isobutanol; and a ketone such as acetone and methyl ethyl ketone can be used. One of these organic solvents may be used alone, or two or more may be used in combination.

The second resin layer 3 preferably has a coefficient of elasticity of 3.22 GPa or more and 3.89 GPa or less. When the diffractive optical element is used under a high temperature and high humidity environment, sufficient durability is obtained with a coefficient of elasticity of 3.22 GPa or more, and a phase shift of a transmitted wavefront is within an acceptable level when the coefficient of elasticity is 3.89 GPa or less.

Next, a method of manufacturing the diffractive optical element of the present disclosure will be described. However, the method of manufacturing is not limited to the method described below. First, a base material 1 and a first mold which has a shape corresponding to the diffraction grating shape of the first resin layer 2 on a surface thereof are disposed opposite to each other with the shape located inside, and a space between the base material 1 and the first mold is filled with a curable curable resin composition which is to be the first resin layer 2. Pressure or heat may be applied to the mold and/or the base material 1 as necessary during filling of the curable curable resin composition. A thickness of the first resin layer 2 can be adjusted by disposing a spacer between the base material 1 and the mold during filling. While a hardening method of the curable curable resin composition is not particularly limited, the curable curable resin composition can be hardened by ultraviolet irradiation or by applying heat, for example. The first mold is released after the hardening to obtain the first resin layer 2 having a diffraction grating shape on its surface.

Thereafter, the first resin layer 2 and a second mold are disposed with a predetermined distance provided therebetween, a place between the first resin layer 2 and the second mold is filled with the curable resin composition for forming the second resin layer 3 described above, the curable resin composition is subsequently hardened, and the second mold is released to obtain the diffractive optical element of the present disclosure. A hardening method of the curable resin composition is selected according to material of the curable resin composition. In addition, a shape of the surface of the second mold is basically plane-shape but is not limited thereto in the present disclosure.

(Optical Apparatus)

Figure 3:
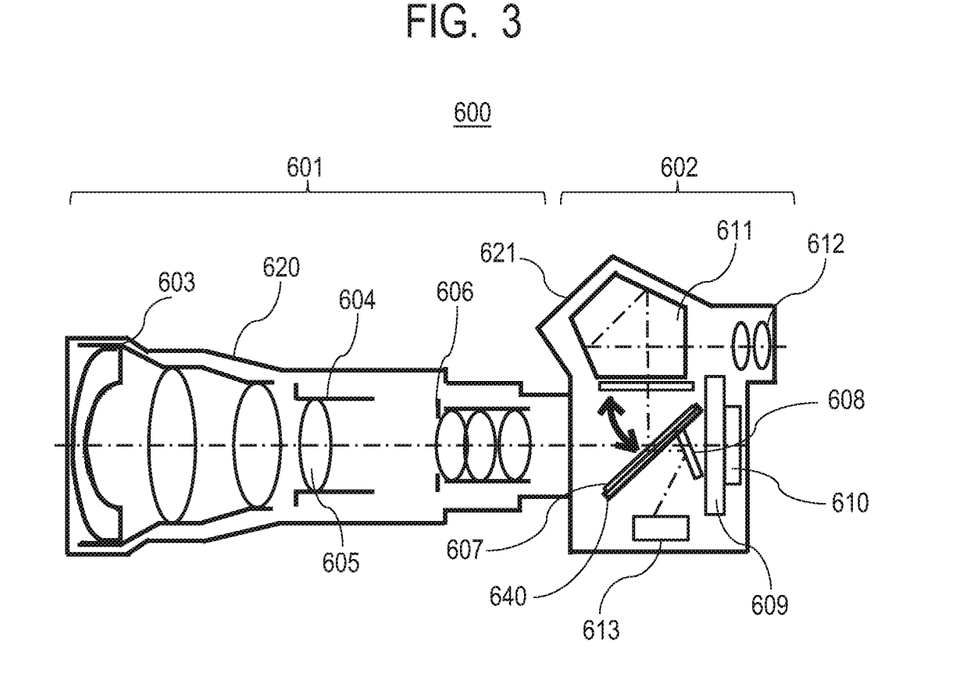
FIG. 3 is a schematic view illustrating an optical apparatus according to one embodiment of the present disclosure.

FIG. 3 is an example of a preferable embodiment of an imaging apparatus of the present disclosure and illustrates a configuration of a single lens reflex digital camera to which a lens barrel (an interchangeable lens), which is an example of the optical apparatus of the present disclosure, is connected.

The optical apparatus of the present disclosure refers to a device which is provided with an optical system including the diffractive optical element of the present disclosure, such as binoculars, a microscope, a semiconductor exposure apparatus and an interchangeable lens. Alternatively, the optical apparatus of the present disclosure refers to a device for generating an image by light having passed through the diffractive optical element of the present disclosure.

In addition, the imaging apparatus of the present disclosure refers to an electronic device provided with an image pickup element which receives light having passed through the diffractive optical element of the present disclosure, such as a camera system including a digital still camera and a digital video camera and a mobile phone. A module configuration installed in an electronic device (for example, a camera module) may be the imaging apparatus in some cases.

In FIG. 3, a camera body 602 and a lens barrel 601, which is the optical apparatus, are connected. The lens barrel 601 is a so-called interchangeable lens detachable from the camera body 602.

Light from an object passes through an optical system including plural lenses 603, 605 disposed on an optical axis of a photographic optical system in a casing 620 of the lens barrel 601, and the light is received by an image pickup element. The diffractive optical element of the present disclosure can be used for the lens 605, for example.

Here, the lens 605 is supported by an inner barrel 604 so that the lens 605 is movably supported with respect to an outer barrel of the lens barrel 601 for focusing and zooming.

During an observation period before photographing, the light from the object is reflected by a main mirror 607 in a casing 621 of the camera body and transmitted through a prism 611. Then, a photographed image is projected for a photographer through a finder lens 612. The main mirror 607 is, for example, a half mirror, light transmitted through the main mirror is reflected by a sub mirror 608 in a direction toward an AF (auto focus) unit 613, and the reflected light is used for measuring a distance, for example. In addition, the main mirror 607 is attached to a main mirror folder 640 by adhesion or the like and supported thereby. During photographing, the main mirror 607 and the sub mirror 608 are transferred to the outside of the optical path and a shutter 609 is opened via a drive mechanism (not shown) to form a photographed optical image entering to the image pickup element 610 from the lens barrel 601. In addition, a diaphragm 606 is configured to change lightness and a depth of focus during photographing by changing an opening area of the diaphragm 606.

EXAMPLES

Hereinafter, the present disclosure will be described more specifically by showing Examples and Comparative Examples. However, the present invention is not limited to the Examples.

Evaluation Method (Grain Size Distribution)

A grain size distribution of an inorganic particle included in a second resin layer was analyzed by carrying out a small angle X-ray scattering (SAXS) analysis on the second resin layer. Measurements were carried out by using NANO-Viewer (Rigaku Corporation). Measurement conditions are shown below.

Wavelength/camera length: 0.154 nm (CuKα)/1320 mm
Measurement region: 0.04 nm$^{-1}$<q<1.24 nm$^{-1}$
Exposure time: 30 minutes×2 times A grain size distribution on a volumetric basis and a mean particle diameter were calculated by fitting a measurement result under the above conditions to a theoretical scattering curve of a sphere with respect to a SAXS profile.

(Viscosity)

A viscosity of the curable resin composition for forming the second resin layer was measured by a small sample viscometer using a microchip and differential pressure method "m-VROC (manufactured by RheoSense, Inc.)." The viscosity was measured under a share rate ranging from 10 s$^{-1}$ to 55 s$^{-1}$ and at a measurement temperature of 22.5±0.5° C., a viscosity at a share rate of 1 s$^{-1}$ was calculated from a logarithm of share rate-viscosity line by extrapolation, and the calculated viscosity was regarded as the viscosity of material.

(Coefficient of Elasticity)

A section of the diffractive optical element was cut out to expose a cross-section of the second resin layer, polishing was performed thereon, a small diamond indentor was pushed into a surface to be measured to a depth of 5 to 20 µm, a load and a displacement were measured, and a coefficient of elasticity was calculated from the obtained load-displacement curve. Nano Indenter G200 (Agilent Technologies, Inc.) was used for measurements.

(Haze)

A spacer having a thickness of 500 µm was disposed on a glass base material having a thickness of 1 mm, and a prepared curable resin composition for forming the second resin layer was poured. A glass base material having a thickness of 1 mm was put thereon to push and widen the curable resin composition, and the curable resin composition was hardened by ultraviolet irradiation from a high-pressure mercury lamp under conditions of 15 mW/cm$^2$ and 3000 seconds. A scattering rate and transmittance of the hardened product at a wavelength of 400 nm were measured by a spectrophotometer (U-4000 Hitachi High-Technologies Corporation), and a Haze value was calculated by the following calculus equation.

Haze value=(scattering rate of sample/transmittance of sample−scattering rate of glass base material/transmittance of glass base material)×100

(Phase Shift of Transmitted Wavefront)

A refractive index difference in a resin layer of a diffractive optical element was evaluated by measuring a transmitted wavefront of the diffractive optical element using an interferometer and calculating a phase shift amount in the transmitted wavefront. The diffractive optical element is designed as a diffraction lens so that first order diffraction light is focused. First, using an interferometer (GPI (product name) manufactured by ZYGO Corporation), the interferometer, an object to be measured and a reflection mirror were placed in this order. Next, the position of the reflection mirror was adjusted to be located at a focal point of the element, a transmitted wavefront of the diffractive optical element was measured, and a phase shift within a ring band and a phase shift between ring bands were calculated.

Example 1

With 51.63 g of a dispersion liquid in which an indium tin oxide (ITO) particle was dispersed in xylene solvent (mean particle diameter: 20 nm, indium tin oxide concentration: 9.96% by mass, amount of dispersing agent: 2.19% by mass, dispersing agent: high molecular weight dispersing agent (manufactured by CIK NanoTek Corporation)), 3.72 g of a mixture of 20% by mass of tris(2-acryloyloxyethyl)isocyanurate), 25% by mass of pentaerythritol triacrylate, 40% by mass of dicyclopentenyloxyethyl methacrylate, 13% by mass of urethane-modified polyester acrylate, and 2% by mass of 1-hydroxycyclohexyl phenyl ketone was mixed as a ultraviolet hardening acrylic-type resin. Thereafter, vacuum concentration at 40° C. was performed by an evaporator while being heated in an oil bath to remove xylene, and an ITO particle-dispersing curable resin composition for forming a first resin layer was obtained.

To 100 parts by mass of a zirconia-methanol dispersion liquid (SZR-M manufactured by Sakai Chemical Industry Co., Ltd., number mean particle diameter: 3 nm, zirconia particle concentration in dispersion liquid: 30% by mass), 4.8 parts by mass of ω-carboxy-polycaprolactone monoacrylate (manufactured by Toagosei Co., Ltd.) was added as a dispersing agent and dissolved by stirring. The solution with the dispersing agent dissolved therein was subjected to dispersing treatment using a bead mill apparatus Ultra Apex Mill UAM-015 (manufactured by Kotobuki Industries Co., Ltd.). The prepared solution was introduced into a dispersion container, and at the same time, a zirconia bead (manufactured by Neturen Co., Ltd.) having a mean particle diameter of 15 µm was introduced as a bead for disintegration. Thereafter, disintegration treatment was performed for one hour with a circumferential velocity of stirring blades of the bead mill of 7.0 m/s, a pump flow rate of 120 ml/min., and the bead for disintegration and a zirconia particle having a large particle diameter were removed from the solution by performing filtration under pressure using a filter having a pore size of 10 µm.

Into the solution after disintegration and classifying treatment, 4.2 parts by mass of tris(2-acryloyloxyethyl)isocyanurate, 2.68 parts by mass of pentaerythritol triacrylate and 8.2 parts by mass of dicyclopentenyloxyethyl acrylate as a curable resin and 0.5 parts by mass of 1-hydroxycyclohexyl phenyl ketone as a photopolymerization initiator were dissolved. Thereafter, vacuum concentration at 40° C. was performed by an evaporator while being heated in an oil bath to remove methanol, and a zirconia particle-dispersing curable resin composition for forming a second resin layer was obtained. The contained amount of methanol was confirmed to be 0.025% by mass or less with respect to the mass of the zirconia particle-dispersing curable resin composition by gas chromatography.

A glass plate was used as the base material. The base material and a first mold having a shape corresponding to a predetermined diffraction grating shape on a surface thereof were disposed opposite to each other with the shape located inside, a space therebetween was filled with the ITO particle-dispersing curable resin composition which was then hardened by ultraviolet irradiation, and the first mold was released to obtain a first resin layer. Then, the first resin layer and a second mold having a plane surface were disposed opposite to each other, a space therebetween was filled with the zirconia particle-dispersing curable resin composition which was then hardened by light irradiation, and the second mold was released to obtain a diffractive optical element.

The diffraction grating of the obtained diffractive optical element was formed with a height of 10 µm and a pitch between gratings ranging from 0.1 mm to 3 mm. The grating pitch at the first ring band was widest, and the grating pitches narrowed toward the 80th ring band at the peripheral edge. The mean thickness of the first resin layer was 12 µm, and the mean thickness of the second resin layer was 53 µm. The mean thicknesses of the first resin layer and the second resin layer were values obtained by averaging the thickness distributions formed in respective layers by diffraction gratings.

Example 2

A diffractive optical element was manufactured under similar conditions to Example 1 except that the bead mill treatment time in the preparation step of the zirconia particle-dispersing curable resin composition for forming a second resin layer was changed to 0.5 hours.

Example 3

A diffractive optical element was manufactured under similar conditions to Example 1 except that the circumferential velocity of stirring blades of the bead mill in the preparation step of the zirconia particle-dispersing curable resin composition for forming a second resin layer was changed to 12.0 m/s.

Comparative Example 1

A diffractive optical element was manufactured under similar conditions to Example 1 except that the dispersing treatment time and the circumferential velocity of stirring blades of the bead mill in the preparation step of the zirconia particle-dispersing curable resin composition for forming a second resin layer were changed to three hours and 12.0 m/s, respectively.

Comparative Example 2

A diffractive optical element was manufactured under similar conditions to Example 1 except that dispersing treatment by the bead mill was not performed in the preparation step of the zirconia particle-dispersing curable resin composition for forming a second resin layer. The grain size distribution of the zirconia particle in the second resin layer, physical property values of the second resin layer, and evaluation results of the diffractive optical element of each of Examples and Comparative Examples described above are shown in Table 1 below.

TABLE 1

|  |  |  |  | Example 1 | Example 2 | Example 3 | Comparative Example 1 | Comparative Example 2 |
|---|---|---|---|---|---|---|---|---|
|  | Mean thickness of first resin layer [µm] |  |  | 12 | 12 | 12 | 12 | 12 |
| Second resin layer | Inorganic particle | Beads mill treatment conditions | Circumferential velocity [m/s] | 7.0 | 7.0 | 12.0 | 12.0 | — |
|  |  |  | Time [h] | 1.0 | 0.5 | 1.0 | 3.0 | — |
|  |  | First peak | Position [nm] | 4.9 | 4.9 | 4.9 | 4.9 | 4.9 |
|  |  |  | Half width [nm] | 2.1 | 2.1 | 2.1 | 2.5 | 1.8 |
|  |  | Second peak | Position [nm] | 10.6 | 11.2 | 0.4 | 10.0 | 13.9 |
|  |  |  | Half width [nm] | 7.0 | 7.3 | 7.1 | 6.3 | 8.1 |
|  |  | Maximum intensity ratio (second peak/first peak) |  | 0.5 | 0.8 | 0.3 | 0.1 | 1.2 |
|  |  | Volume mean particle diameter [nm] |  | 11.4 | 11.9 | 11.3 | 14.6 | 11.3 |
|  | Mean thickness [µm] |  |  | 53 | 52 | 53 | 55 | 50 |
|  | Viscosity of curable resin composition [Pa · s] |  |  | 72 | 65 | 88 | 163 | 55 |
|  | Coefficient of elasticity [GPa] |  |  | 3.53 | 3.36 | 3.77 | 3.89 | 3.22 |
|  | Haze value [%] |  |  | 1.09 | 1.21 | 1.02 | 0.98 | 1.62 |
|  | Phase shift of transmitted wavefront [λ] |  |  | 0.015 | 0.01 | 0.02 | 0.03 | 0.01 |

As shown in Table 1, peak intensity ratios in the grain size distributions of the inorganic particle in the curable resin composition could be controlled by bead mill treatment conditions. Disintegration of an aggregated secondary particle and surface treatment of the inorganic particle with the dispersing agent were progressed by increasing the circumferential velocity and lengthening the treatment time, and the peak of the aggregated secondary particle became smaller. In addition, it was also confirmed that when bead mill treatment was excessively performed, on the contrary an aggregated particle having a larger particle diameter was generated. It has been found from Table 1 that a refractive index difference in the second resin layer can be reduced while keeping a Haze value of the second resin layer low when the peak intensity ratio is within a range of 0.3 or more and 0.8 or less. As illustrated by Comparative Example 1, when the peak intensity ratio of the inorganic particle in the second resin layer becomes small, the specific surface area of the inorganic particle in the second resin layer increases and the viscosity of the curable resin composition on forming the second resin layer increases. In addition, the cause of the increase in the refractive index difference in the second resin layer is thought to be as follows. When the viscosity of the curable resin composition increases and flowability thereof decreases, a difference in contraction amounts on hardening and contraction becomes difficult to be canceled by the movement of the curable resin composition. In addition, as illustrated by Comparative Example 2, when bead mill treatment is not performed and the peak intensity ratio increases, the viscosity of the curable resin composition decreases. Further, disarrangement of the inorganic particle also occurs, and the coefficient of elasticity of the second resin layer after hardening also decreases. Consequently, relaxation during hardening easily occurs, and residual stress is also reduced. Therefore, even the refractive index difference in the second resin layer could be kept low, the Haze value in the second resin layer increased because of a large amount of the aggregated secondary particle, which is not preferable as a diffractive optical element.

According to the present disclosure, a diffractive optical element in which, by limiting a grain size distribution of an inorganic particle contained in a second resin layer, a refractive index difference generated in the second resin layer is reduced to reduce a phase shift of a transmitted wavefront can be provided. Accordingly, an optical apparatus excellent in optical characteristics can be provided by using the diffractive optical element.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-187090, filed Oct. 2, 2018, which is hereby incorporated by reference herein in its entirety.

What is claimed is:

1. A diffractive optical element comprising a base material, a first resin layer and a second resin layer laminated in this order, wherein the first resin layer has a diffraction grating shape on a side facing the second resin layer, and the first resin layer or the second resin layer contains inorganic particles, wherein
the inorganic particles have a number mean particle diameter of 10 nm or less, have a first peak in a region in which particle diameters are 2 nm or more and 7.9 nm or less and have a second peak in a region in which particle diameters are larger than the particle diameters of the first peak in a grain size distribution on a volumetric basis,
a ratio of a maximum intensity of the second peak to a maximum intensity of the first peak is 0.3 or more and 0.8 or less, and
wherein a half width of the first peak is 1.8 nm or more and 2.5 nm or less.

2. The diffractive optical element according to claim 1, wherein the second peak is located in a region in which particle diameters are 8 nm or more and 20 nm or less and has a half width of 6.3 nm or more and 8.1 nm or less.

3. The diffractive optical element according to claim 1, wherein a volume mean particle diameter of the inorganic particles is 11.3 nm or more and 14.6 nm or less.

4. The diffractive optical element according to claim 1, wherein a maximum particle diameter of the inorganic particles is 100 µm or less.

5. The diffractive optical element according to claim 1, wherein the second resin layer has a coefficient of elasticity of 3.22 GPa or more and 3.89 GPa or less.

6. An optical apparatus, comprising:
a casing; and
an optical system including a plurality of lenses disposed in the casing,
wherein at least one of the lenses is the diffractive optical element according to claim 1.

7. An imaging apparatus, comprising:
a casing;
an optical system including a plurality of lenses disposed in the casing; and
an image pickup element configured to receive light having passed through the optical system, wherein
at least one of the lenses is the diffractive optical element according to claim 1.

8. The imaging apparatus according to claim 7, wherein the imaging apparatus is a camera.

9. The diffractive optical element according to claim 1, wherein the first resin layer has the diffraction grating shape including a plurality of concentric ring bands on a side facing the second resin layer.

10. The diffractive optical element according to claim 1, wherein the second resin layer contains the inorganic particles.

11. The diffractive optical element according to claim 10, wherein the inorganic particles are a zirconia particle.

12. The diffractive optical element according to claim 10, wherein the second resin layer includes the inorganic particles dispersed in a (meth)acrylic-type resin.

13. The diffractive optical element according to claim 10, wherein when a refractive index and Abbe's number of the first resin layer are nd1 and v1 respectively and a refractive index and Abbe's number of the second resin layer are nd2 and v2 respectively, relationships of nd1<nd2 and v1 <v2 are satisfied.

14. A curable resin composition comprising inorganic particles and a curable resin, wherein
the inorganic particles have a number mean particle diameter of 10 nm or less, have a first peak in a region in which particle diameters are 2 nm or more and 7.9 nm or less and have a second peak in a region in which particle diameters are larger than the particle diameters of the first peak in a grain size distribution on a volumetric basis,
a ratio of a maximum intensity of the second peak to a maximum intensity of the first peak is 0.3 or more and 0.8 or less, and
wherein a half width of the first peak is 1.8 nm or more and 2.5 nm or less.

15. A method of manufacturing a diffractive optical element including a base material, a first resin layer and a second resin layer laminated in this order, wherein the first resin layer has a diffraction grating shape on a side facing the second resin layer, and the first layer or the second resin layer contains an inorganic particle, the method comprising:
- forming the first resin layer having the diffraction grating shape on the base material;
- crushing, classifying and adjusting the inorganic particle so that the inorganic particle has a number mean particle diameter of 10 nm or less, has a first peak in a region in which particle diameters are 2 nm or more and 7.9 nm or less and has a second peak in a region in which particle diameters are larger than the particle diameters of the first peak in a grain size distribution on a volumetric basis and that a ratio of a maximum intensity of the second peak to a maximum intensity of the first peak is 0.3 or more and 0.8 or less, and the half width of the first peak is 1.8 nm or more and 2.5 nm or less;
- mixing the inorganic particle having been subjected to the adjusting and a curable resin to prepare a curable resin composition; and
- disposing a mold opposite to the first resin layer, filling a space between the first resin layer and the mold with the curable resin composition and hardening the curable resin composition.

* * * * *